United States Patent [19]
Gruna

[11] 3,903,629
[45] Sept. 9, 1975

[54] EMERGENCY SIGN FOR AUTOMOTIVE VEHICLES

[76] Inventor: Leo Gruna, 72-81 113th St., Forest Hills, N.Y. 11375

[22] Filed: Jan. 26, 1973

[21] Appl. No.: 326,807

[52] U.S. Cl..................... 40/129 C; 40/5; 40/125 R
[51] Int. Cl.².......................................... G09F 21/04
[58] Field of Search.......... 40/125 R, 125 N, 125 H, 40/129 R, 129 A, 129 B, 129 C, 5, 124.1

[56] References Cited
UNITED STATES PATENTS

| 2,060,055 | 11/1936 | Eichelsdoerfer | 40/129 C |
| 2,383,884 | 8/1945 | Palmquist | 40/135 X |
| 2,620,579 | 12/1952 | Dienes | 40/129 C |
| 3,074,193 | 1/1963 | Munson | 40/125 R X |
| 3,670,438 | 6/1972 | Carroll et al. | 40/129 C |
| 3,673,718 | 7/1972 | Bernard | 40/5 |

FOREIGN PATENTS OR APPLICATIONS

| 408,389 | 1/1925 | Germany | 40/5 |

Primary Examiner—Robert W. Michell
Assistant Examiner—John F. Pitrelli
Attorney, Agent, or Firm—Karl F. Ross; Herbert Dubno

[57] ABSTRACT

An emergency sign, to be suspended in a window or at the back of an automotive vehicle, has a solid octagonal frame with a pair of slots traversed by an endless flexible band which is divided into sections, each section carrying a particular distress notice adapted to be displayed between these slots in a corresponding band position. A flap attached to the band carries on one side a further distress notice and also has a blank side that is visible when the band is moved into a position in which the flap overhangs a stationary SOS message at the front of the flap; in the same position, another band section bearing the no-distress notation "OK" is displayed between the slots.

7 Claims, 3 Drawing Figures

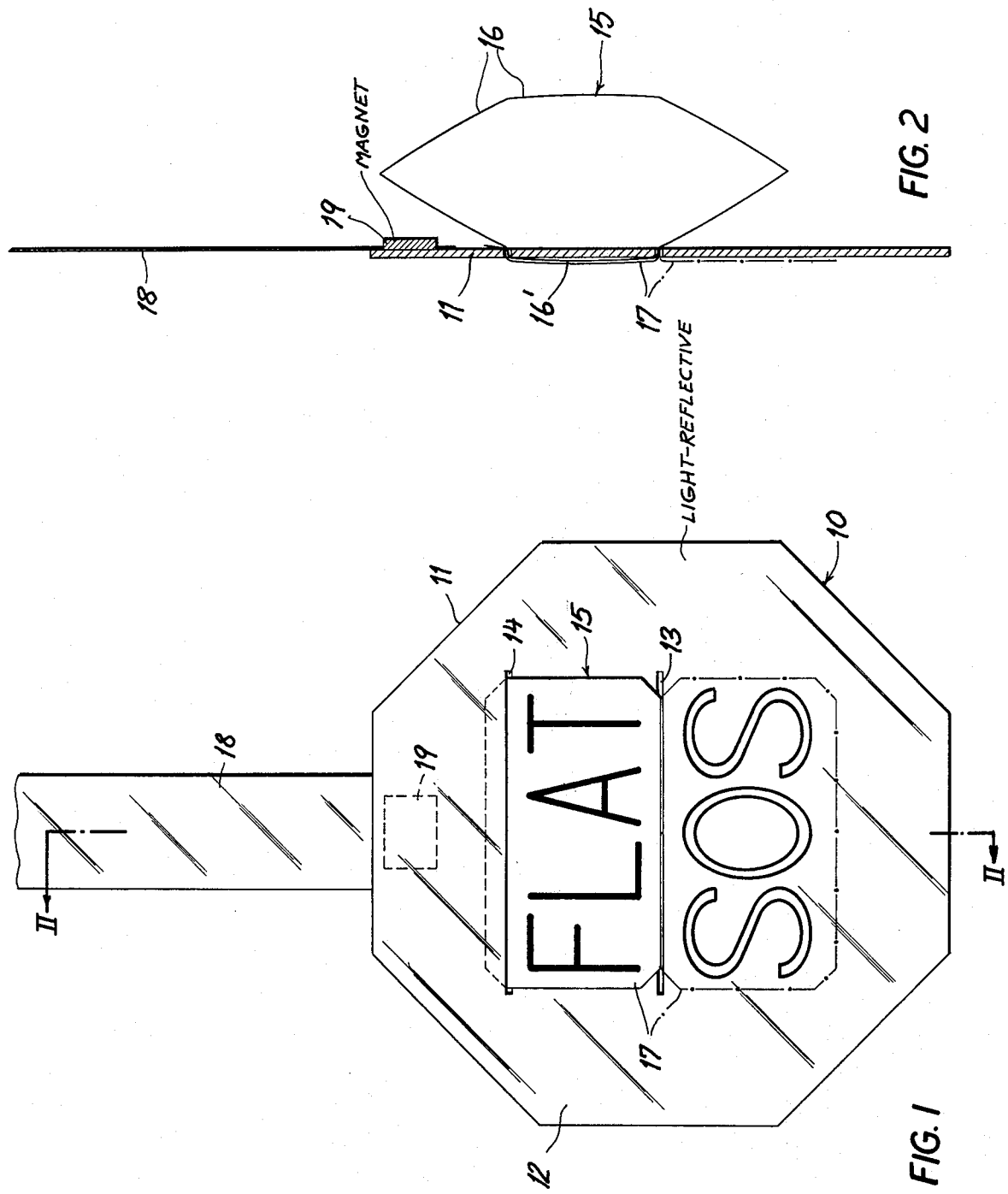

EMERGENCY SIGN FOR AUTOMOTIVE VEHICLES

FIELD OF THE INVENTION

My present invention relates to an emergency sign to be temporarily secured to an automotive vehicle for the purpose of summoning assistance and, at the same time, warning oncoming traffic of the presence of an obstacle.

BACKGROUND OF THE INVENTION

Operators of stalled vehicles are advised by the authorities to summon help by tying a white handkerchief or the like to a radio antenna or some other suitable part of the vehicle body. By this means, however, it is not possible to inform other motorists of the nature of the emergency so that even minor mishaps (e.g. the lack of a certain tool), which could be overcome with the help of some passing motorist, may compel the driver to await the arrival of a police car or a tow truck.

OBJECTS OF THE INVENTION

The general object of my present invention is to provide an emergency sign adapted to indicate precisely to passing motorists the reason for the stalling of a vehicle on a highway while at the same time acting as a clearly visible warning device, especially at night.

A more particular object is to provide a device of this character which can also be used to indicate, where appropriate, that no emergency situation exists and assistance is not required.

SUMMARY OF THE INVENTION

These objects are realized, in accordance with my present invention, by the provision of a more or less rigid frame having a window for the passage of a carrier of distress notices, any one of several such notices being selectively alignable with the window for display as the frame is secured to the vehicle, e.g. on the side or in the back thereof. The frame may be of octagonal outline, resembling a stop sign, and advantageously has a highly light-reflective front surface.

According to a more specific feature of my invention, the carrier is a flexible member — preferably an endless band — divided, e.g. by crease lines, into a plurality of sections of a height substantially corresponding to the spacing of two slots defining the window, each section bearing a respective notice. A flap movably secured to this member, at the junction of two adjoining sections, is optionally insertable into at least one of these slots (e.g. the upper one if the slots are horizontal) in front of one of these adjoining sections in order to cover up a notice appearing on that section, e.g. a "no-distress" signal such as the notation "O.K." otherwise used to indicate that no emergency is present. The same flap may be used in an alternate position to expose that no-distress notation and to overhang a fixed message appearing on an adjacent frame portion representing a request for assistance, such as the notation "SOS." Finally, the side of the flap exposed in its first-mentioned position may bear a further distress notice.

BRIEF DESCRIPTION OF THE DRAWING

The above and other features of my invention will now be described in detail with reference to the accompanying drawing in which:

FIG. 1 is a face view of an emergency sign embodying my invention;

FIG. 2 is a sectional view taken on the line II—II of FIG. 1; and

SPECIFIC DESCRIPTION

Figure 3:
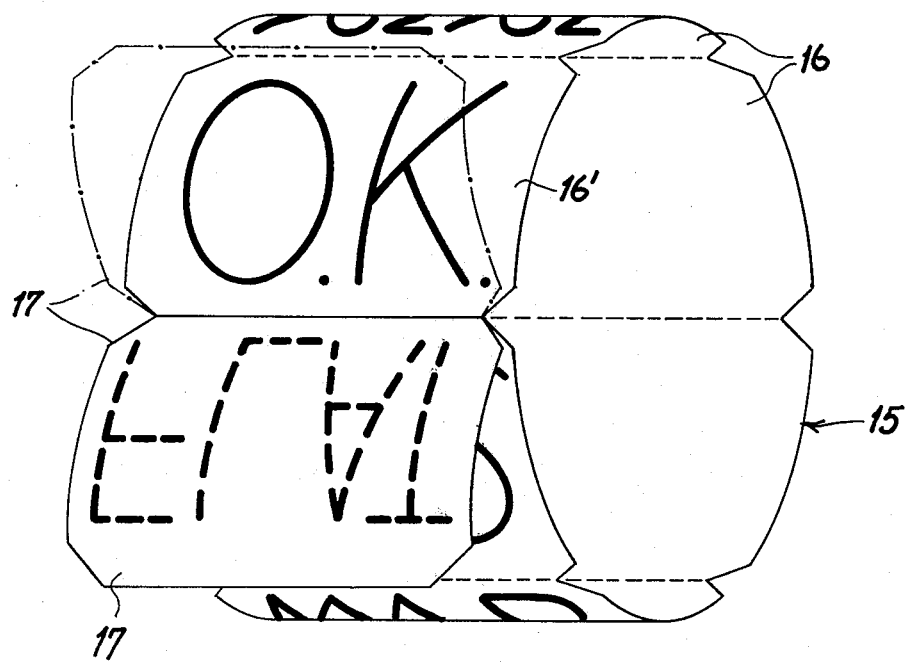
FIG. 3 is a perspective view of an endless band forming part of the emergency sign of FIGS. 1 and 2.

The emergency sign shown in FIG. 1, generally designated 10, comprises a frame 11 of cardboard, sheet plastic or the like having an octagonal outline (as conventionally used for traffic stop signs) and a brightly colored, highly light-reflective surface 12. Frame 11 is further provided with a pair of parallel slots 13 and 14, slot 13 being located along a horizontal median line of the octagon.

An endless band 15 of paper or other flexible material, divided by transverse crease lines into a number of sections 16 carrying differnt distress notices along the outer band surface, is threaded through the slots 13, 14 which are spaced apart by a distance equaling the height of any band section to facilitate the display of a particular distress notice chosen. Located on frame 11 just beneath the slot 13, on an area approximately equal to that of the individual band sections, is a request for assistance, here the letters SOS representing the international distress signal.

The endless band 15 is easily moved through the slots 13, 14 to any position exhibiting a desired notice, with the remainder of the band lying more or less flat against the back of the frame 11. The band 15 is also provided with a movable flap 17, slightly higher than the sections 16, attached to the band at a point just beneath a section 16' carrying the no-distress notation O.K. The flap 17 has a distress notice on one side, i.e. the side hidden in FIG. 3, while the other side is left blank. When the trapezoidal free end 17' of the flap 17 is allowed to remain in slot 14, with the flap bent up as shown in full lines in FIGS. 1 and 2 and in phantom lines in FIG. 3, the flap covers the O.K. notice and displays its own distress message (here the word FLAT). On being withdrawn from slot 14 by flexing so as to hang down from slot 13 as shown in full lines in FIG. 3 and in phantom lines in FIGS. 1 and 2, the flap 17 covers the SOS indicia and reveals the O.K. notice.

A flexible strap 18, attached to the frame 11 and having the same brightly colored, highly light-reflective surface as the visible frame side 12, can be gripped between the body of a motor vehicle and a closed trunk lid or window pane to display the sign 10. Alternatively, the sign can be attached to the vehicle body by means of a magnet 19 provided on the back of the frame 11.

I claim:

1. An emergency sign for use with automotive vehicles, comprising:

a frame provided with a pair of parallel slots defining a window for the display of a distress notice;

a flexible carrier passing through said slots, said carrier being divided into a plurality of sections each of a height substantially corresponding to the spacing of said slots, each of said sections having a front side provided with information visible between said slots upon alignment of the section with said window, said frame having a portion separated from said window by one of said slots and provided with a normally visible request for assistance;

a flap movably secured to said carrier at the junction of two adjoining sections thereof, said flap having a width less than the length of said slots so as to be extendible through said window to overlie said portion and conceal said request for assistance in a carrier position in which one adjoining section registers with said window, the information on said one adjoining section visible in said carrier position being a no-distress notice, the information on the other sections of said carrier being various types of distress notices said flap having a height greater than the distance between said slots for selective retention in said window; and fastening means for securing said frame to a vehicle.

2. An emergency sign as defined in claim 1 wherein said flap has a reverse side carrying a further distress notice visible upon insertion of a free end thereof into the other of said slots in said carrier position to overlie said one adjoining section and conceal said no-distress notice while uncovering said request for assistance.

3. An emergency sign as defined in claim 1 wherein said slots are horizontal.

4. An emergency sign as defined in claim 1 wherein said carrier is an endless band.

5. An emergency sign as defined in claim 1 wherein said frame is of octagonal outline.

6. An emergency sign as defined in claim 1 wherein said frame is provided with a highly light-reflective front surface.

7. An emergency sign as defined in claim 1 wherein said fastening means includes a flexible strap with a highly light-reflective front surface.

* * * * *